United States Patent
Sugahara et al.

(10) Patent No.: US 9,003,202 B2
(45) Date of Patent: Apr. 7, 2015

(54) MEMORY CONTROL DEVICE, SEMICONDUCTOR MEMORY DEVICE, MEMORY SYSTEM, AND MEMORY CONTROL METHOD

(75) Inventors: Takahiko Sugahara, Osaka (JP); Tetsuo Furuichi, Osaka (JP); Ikuo Yamaguchi, Osaka (JP); Takashi Oshikiri, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 177 days.

(21) Appl. No.: 13/257,644

(22) PCT Filed: Apr. 5, 2010

(86) PCT No.: PCT/JP2010/056156
§ 371 (c)(1),
(2), (4) Date: Sep. 20, 2011

(87) PCT Pub. No.: WO2010/122895
PCT Pub. Date: Oct. 28, 2010

(65) Prior Publication Data
US 2012/0023338 A1   Jan. 26, 2012

(30) Foreign Application Priority Data
Apr. 23, 2009  (JP) .............................. 2009-105041

(51) Int. Cl.
*G06F 21/00* (2013.01)
*G06F 21/72* (2013.01)

(52) U.S. Cl.
CPC ........ *G06F 21/72* (2013.01); *G06F 2221/2105* (2013.01)

(58) Field of Classification Search
None
See application file for complete search history.

(56) References Cited

U.S. PATENT DOCUMENTS

2004/0030896 A1 *  2/2004  Sakamura et al. ............. 713/169
2004/0098518 A1 *  5/2004  Beckett et al. .................. 710/14

(Continued)

FOREIGN PATENT DOCUMENTS

JP          4 42383        2/1992
JP         04042383 A  *  2/1992

(Continued)

OTHER PUBLICATIONS

International Preliminary Report on Patentability issued Dec. 1, 2011, in PCT/JP2010/056156 (English-language translation only).
Written Opinion of the International Searching Authority issued Jun. 15, 2010, in PCT/JP2010/056156 (with English-language translation).

(Continued)

*Primary Examiner* — Gilberto Barron, Jr.
*Assistant Examiner* — Malcolm Cribbs
(74) *Attorney, Agent, or Firm* — Oblon, Spivak, McClelland, Maier & Neustadt, L.L.P.

(57) ABSTRACT

A technique for improving data security is provided. To be specific, in a memory system including an information processing apparatus and a semiconductor memory device, the semiconductor memory device has an interface section that transmits, to the information processing apparatus, data read out from a memory core according to a plurality of communication protocols having different signal transmission/reception methods. Based on a switch command inputted from the information processing apparatus, a communication protocol selection section inputs, to the interface section, a selection signal for selecting a particular communication protocol from the plurality of communication protocols.

11 Claims, 8 Drawing Sheets

(56) References Cited

U.S. PATENT DOCUMENTS

| | | |
|---|---|---|
| 2007/0170266 A1* | 7/2007 | Krygier et al. ............... 235/492 |
| 2007/0210162 A1* | 9/2007 | Keen et al. ................... 235/451 |
| 2008/0059659 A1* | 3/2008 | Moritani et al. ................ 710/8 |
| 2008/0183982 A1 | 7/2008 | Sugahara et al. |

FOREIGN PATENT DOCUMENTS

| | | |
|---|---|---|
| JP | 7-219852 | 8/1995 |
| JP | 9 269917 | 10/1997 |
| JP | 2000-324104 | 11/2000 |
| JP | 2007 334616 | 12/2007 |

OTHER PUBLICATIONS

U.S. Appl. No. 13/257,680, filed Sep. 20, 2011, Sugahara, et al.

International Search Report Issued Jun. 15, 2010 in PCT/JP10/056156 filed Apr. 5, 2010.

Office Action issued Sep. 3, 2013, in Japanese Patent Application No. 2009-105041 filed Apr. 23, 2009 (with English-language Translation), 6 pages.

Office Action issued on Feb. 4, 2014 in the corresponding Japanese Patent Application No. JP2009-105041 (with partial English Translation).

* cited by examiner

F I G. 3
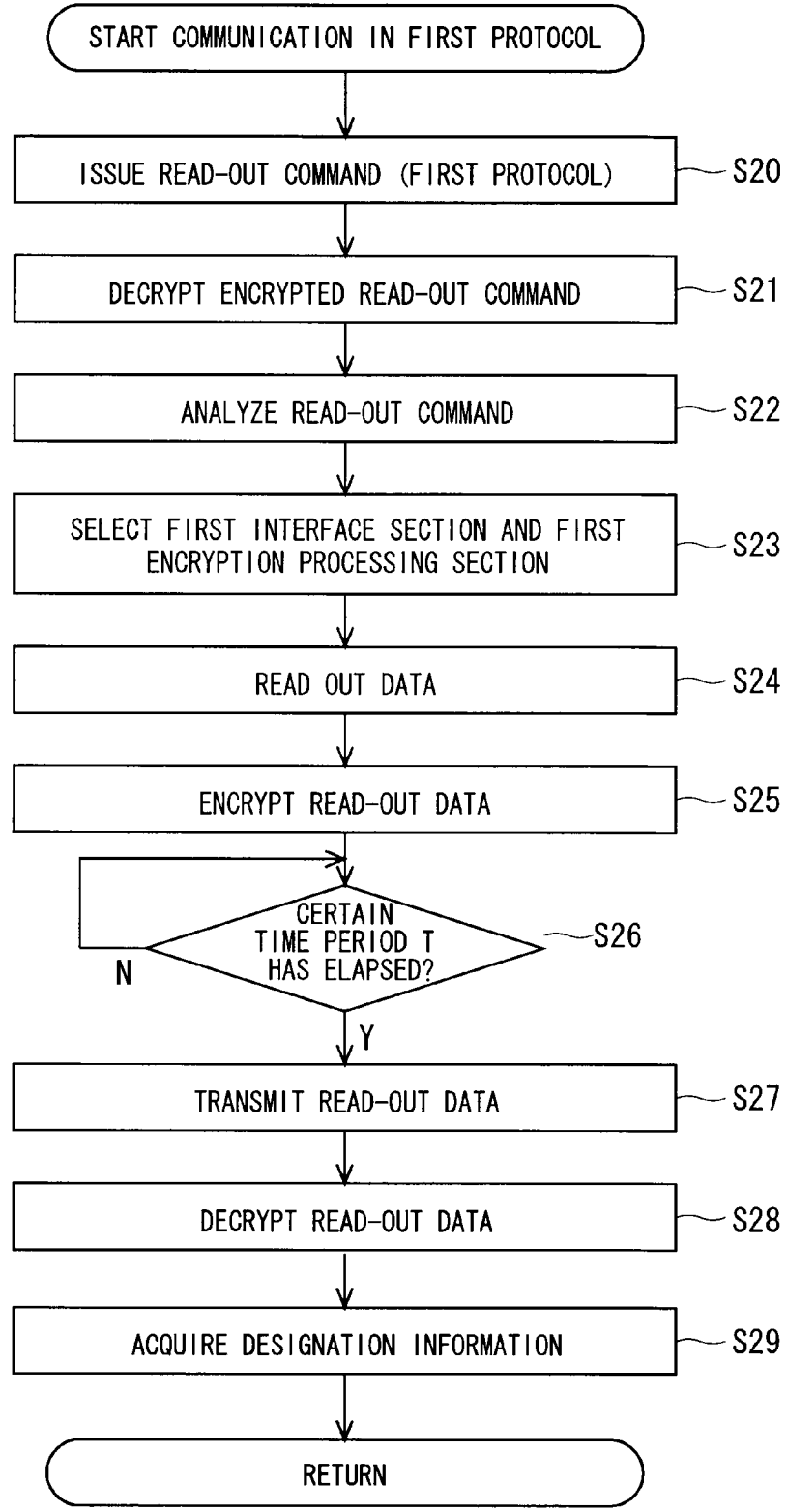

F I G . 5
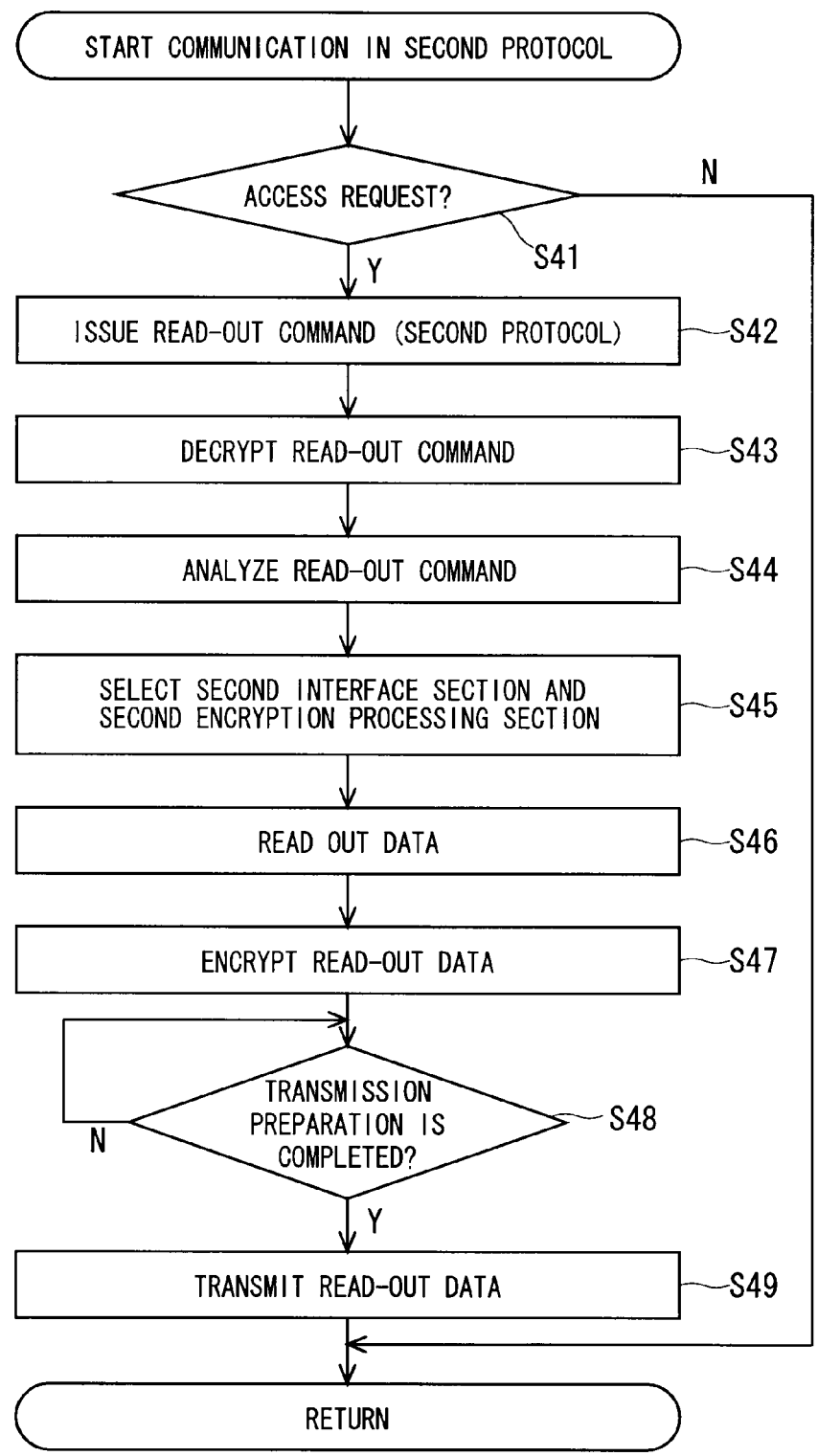

F I G . 6
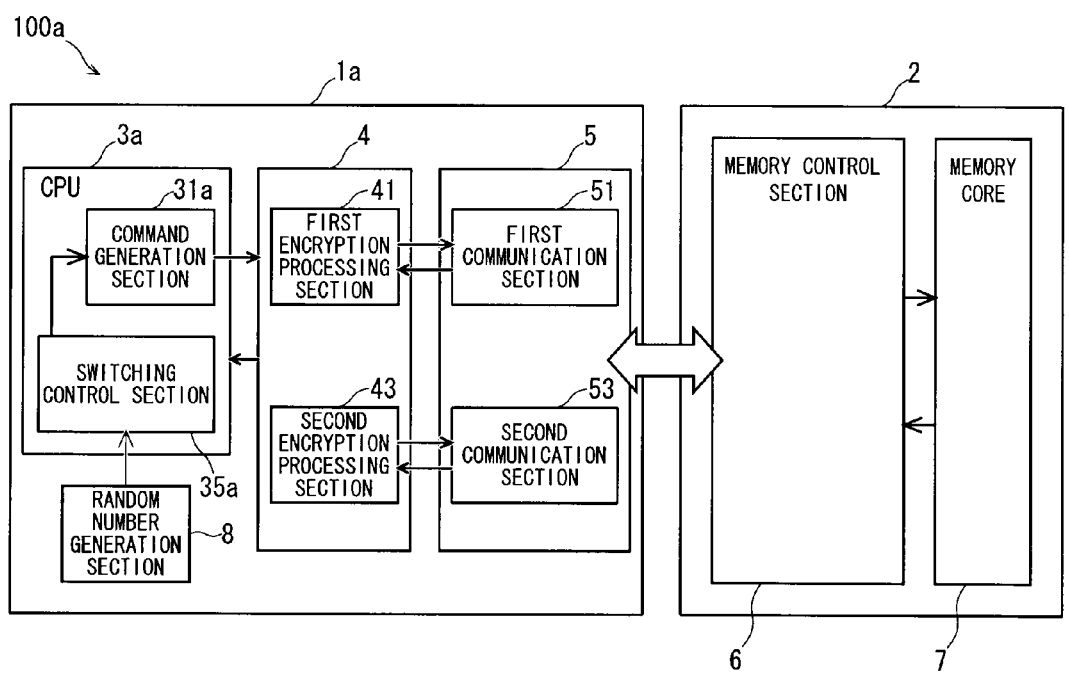

F I G . 8
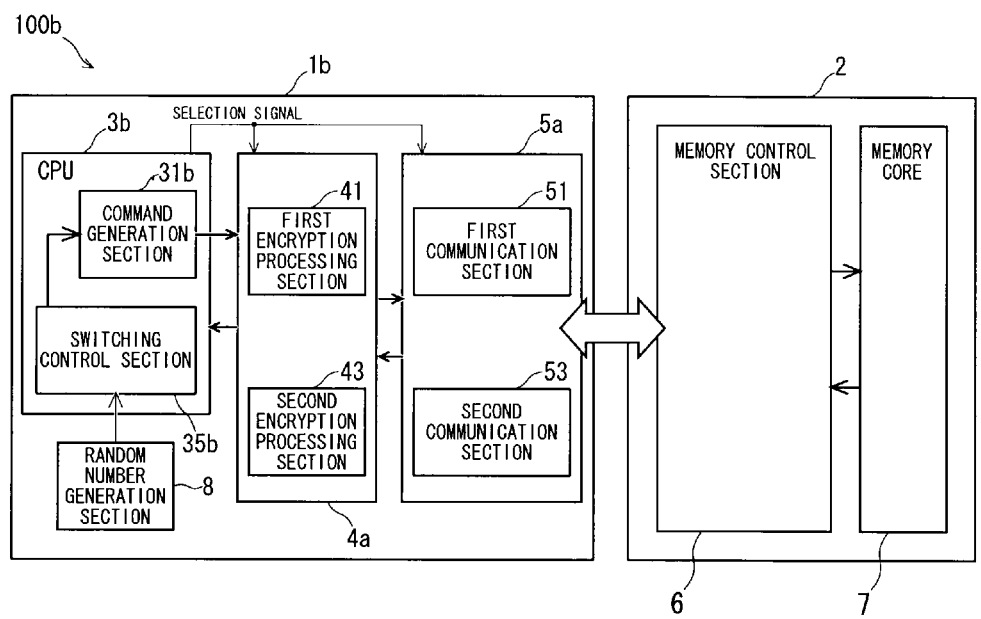

MEMORY CONTROL DEVICE, SEMICONDUCTOR MEMORY DEVICE, MEMORY SYSTEM, AND MEMORY CONTROL METHOD

TECHNICAL FIELD

The present invention relates to a security technology for suppressing an unauthorized access to a memory core.

BACKGROUND ART

Conventionally, a memory system including an information processing apparatus and a semiconductor memory storing data therein is known. For example, a memory system is built with a computer serving as the information processing apparatus, a flash memory, and the like.

In a conventional memory system, a semiconductor memory device employs some kind of a security function in order to prevent unauthorized copying of data by an unauthorized user or the like (for example, Patent Document 1).

The Patent Document 1 discloses a technique in which address information inputted to a semiconductor memory device or data outputted from the semiconductor memory device is encrypted by a logic circuit to thereby protect the confidentiality of data.

PRIOR-ART DOCUMENTS

Patent Documents

Patent Document 1: Japanese Patent Application Laid-Open No. 1995-219852

SUMMARY OF THE INVENTION

For a further improvement of data security in a conventional memory system, it is conceivable to further increase the strength of encryption. However, increasing the strength of encryption may cause adverse effects such as a deterioration in the data processing rate and a deterioration in the data transfer efficiency. Therefore, a technique for improving data security by a method other than encryption is demanded.

The present invention has been accomplished in view of the problem described above, and an object of the present invention is to provide a technique for improving data security.

To solve the above-described problem, a first aspect is a memory control device for controlling an access to a memory core storing data therein, the memory control device including: a communication protocol selection section for selecting a particular communication protocol from a plurality of communication protocols having different signal transmission/reception methods, based on a command input given from an external apparatus; and a data transmission section for transmitting, to the external apparatus, data read out from a memory core based on a read-out request given from the external apparatus, according to the particular communication protocol selected by the communication protocol selection section.

In the first aspect, data communication with the external apparatus according to the plurality of communication protocols is allowed. This makes it difficult to analyze a specification of an operation performed between the external apparatus and the memory core. Therefore, an unauthorized access to the memory core is suppressed, thus improving data security.

A second aspect is the memory control device according to the first aspect, further including: a plurality of encryption processing sections having different encryption methods; and an encryption processing selection section for selecting a particular encryption processing section from the plurality of encryption processing sections, based on a command input given from the external apparatus, wherein the data transmission section transmits, to the external apparatus, data encrypted by the particular encryption processing section selected by the encryption processing selection section.

In the second aspect, the encrypted data can be communicated with the external apparatus, thus improving data security.

A third aspect is the memory control device according to the second aspect, wherein the plurality of communication protocols include a communication protocol by which the transmission to the external apparatus is started after the data encrypted by the particular encryption processing section is allowed to be outputted to the data transmission section.

In the third aspect, after the encryption processing section completes a preparation for data output, the data transmission section starts data transmission to the external apparatus. Therefore, a data transmission timing can be changed in accordance with a time required for the preparation for the output. This makes it difficult to analyze the operation specification.

A fourth aspect is the memory control device according to any one of the first to third aspects, wherein: the data transmission section transmits, to the external apparatus, data in which designation information designating the particular communication protocol is added to read-out data read out from the memory core in response to the request given from the external apparatus; and the communication protocol selection section selects the particular communication protocol in accordance with a command issued by the external apparatus based on the designation information.

In the memory control device according to the fourth aspect, switching of the communication protocol can be easily performed based on the read-out data.

A fifth aspect is a semiconductor memory device including: a memory core storing therein data to be processed by an external apparatus; a communication protocol selection section for selecting a particular communication protocol from a plurality of communication protocols having different signal transmission/reception methods, based on a command input given from the external apparatus; and a data transmission section for transmitting, to the external apparatus, data read out from the memory core based on a read-out request given from the external apparatus, according to the particular communication protocol selected by the communication protocol selection section.

A sixth aspect is a memory system including an information processing apparatus and a semiconductor memory device, wherein the semiconductor memory device includes: a memory core storing therein data to be processed by an external apparatus; a communication protocol selection section for selecting a particular communication protocol from a plurality of communication protocols having different signal transmission/reception methods, based on a command input given from the external apparatus; and a data transmission section for transmitting, to the external apparatus, data read out from the memory core based on a read-out request given from the external apparatus, according to the particular communication protocol selected by the communication protocol selection section.

A seventh aspect is the memory system according to the sixth aspect, wherein the information processing apparatus includes: a command generation section for generating a command that designates, to the semiconductor memory device, a particular communication protocol from the plurality of communication protocol; and a communication section for performing data communication with the semiconductor memory device according to any one of the plurality of communication protocols, and wherein the communication protocol selection section selects the particular communication protocol based on the command generated by the command generation section.

An eighth aspect is a memory control method for controlling an access to a memory core storing data therein, the method including the steps of: (a) selecting a particular communication protocol from a plurality of communication protocols having different signal transmission/reception methods, based on a command input given from an external apparatus; and (b) transmitting, to the external apparatus, data read out from the memory core based on a read-out request given from the external apparatus, according to the particular communication protocol selected in the step (a).

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart showing details of a communication procedure in a first protocol.

FIG. 5 is a flowchart showing details of a communication procedure in a second protocol.

FIG. 6 is a block diagram showing a memory system according to a second embodiment.

FIG. 8 is a block diagram showing a memory system according to a third embodiment.

EMBODIMENT FOR CARRYING OUT THE INVENTION

Hereinafter, some preferred embodiments of the present invention will be described in detail with reference to the accompanying drawings.

1. First Embodiment

<1.1. Configuration and Function of Memory System>

Figure 1:
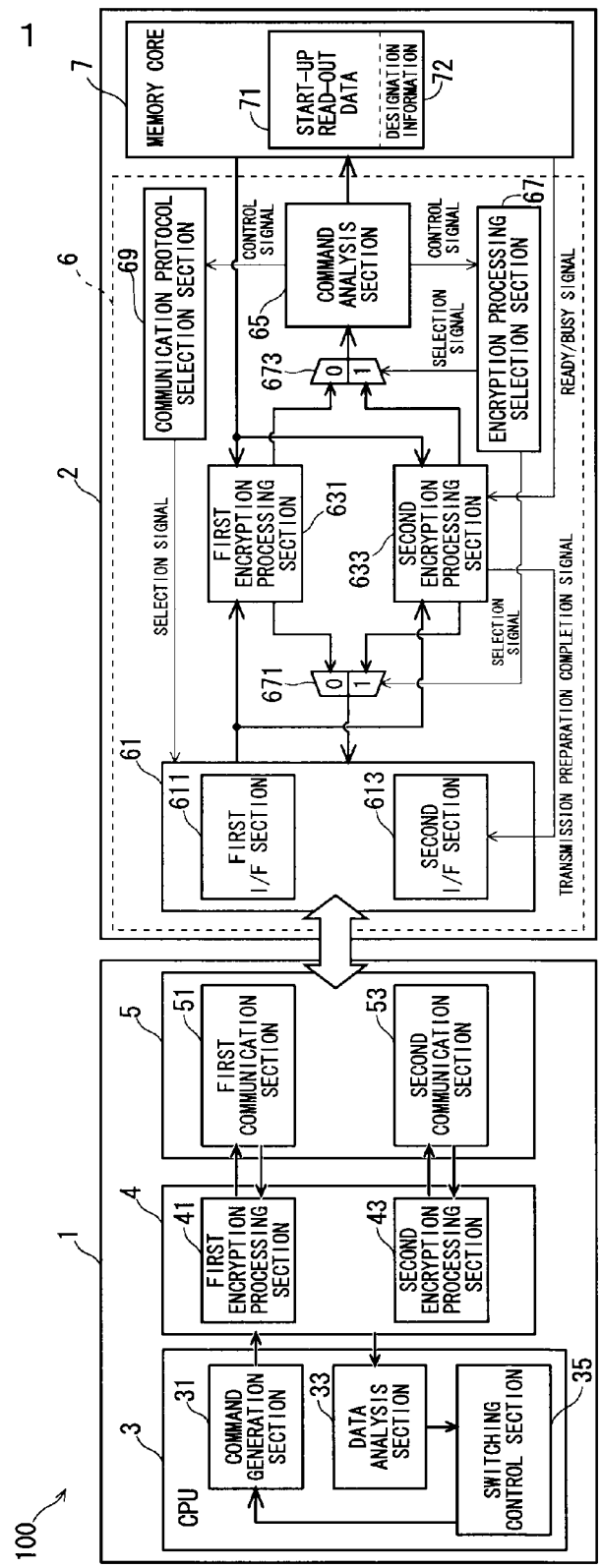
FIG. 1 is a block diagram showing a memory system according to a first embodiment of the present invention.

FIG. 1 is a block diagram showing a memory system 100 according to a first embodiment of the present invention. The memory system 100 according to the present invention includes an information processing apparatus 1 and a non-volatile semiconductor memory device (and more specifically, a ROM, a flash memory, or the like) 2 removably mounted to the information processing apparatus 1. The semiconductor memory device 2 stores therein, for example, a program and various content data, such as video data, image data, and music data, that are to be protected from unauthorized data reading. Although the information processing apparatus 1 is a general purpose apparatus, it may be an apparatus (such as a PDA and a mobile phone) dedicated to a special application. In this embodiment, the information processing apparatus 1 functions as an external apparatus to exchange various data with the semiconductor memory device 2.

<Information Processing Apparatus 1>

The information processing apparatus 1 includes a CPU 3, an encryption processing section 4, and a communication section 5. The information processing apparatus 1 has ordinary computer components such as a RAM, though not shown. A command generation section 31, a data analysis section 33, and a switching control section 35 shown in FIG. 1 are functional blocks implemented by the CPU 3 operating in accordance with a predetermined program.

<Command Generation Section 31>

The command generation section 31 generates a command (read-out command) requesting the semiconductor memory device 2 to read out specific data, and a command (switch command) designating a communication protocol to be used between the information processing apparatus 1 and the semiconductor memory device 2. The command generated by the command generation section 31 is inputted to the encryption processing section 4.

<Data Analysis Section 33>

The data analysis section 33 analyzes read-out data read out from the semiconductor memory device 2, and acquires designation information included in the read-out data. In this embodiment, data (start-up read-out data 71) that is read out each time the information processing apparatus 1 is started up includes designation information 72. The designation information is a predetermined code designating a communication protocol to be used between the information processing apparatus 1 and the semiconductor memory device 2.

<Switching Control Section 35>

The switching control section 35 causes the command generation section 31 to generate the switch command for switching the communication protocol, based on the designation information acquired by the data analysis section 33.

<Encryption Processing Section 4>

The encryption processing section 4 encrypts the command generated by the command generation section 31 and transmits a resulting command to the communication section 5, and decrypts data inputted from the semiconductor memory device 2 to the information processing apparatus 1. The encryption processing section 4 includes a first encryption processing section 41 and a second encryption processing section 43 having different encryption algorithms.

The first encryption processing section 41 and the second encryption processing section 43 execute encryption processing based on a stream encryption, and their key information used in the encryption processing are different from each other. Having different encryption algorithms is not limited to simply having different key information used as in this embodiment, but also includes having different encryption methods, such as a stream encryption and a block encryption, or a public-key cryptography and a common-key cryptography. In the following, for convenience of the description, the encryption algorithm implemented in the first encryption processing section 41 will be referred to as a first algorithm, while the encryption algorithm implemented in the second encryption processing section 43 will be referred to as a second algorithm.

<Communication Section 5>

The communication section 5 performs data communication with the semiconductor memory device 2 according to a plurality of communication protocols (a first protocol and a second protocol) having different signal transmission/reception methods. The communication section 5 includes a first communication section 51 operable according to the first protocol and a second communication section 53 operable according to a second protocol.

The first communication section 51 generates an access waveform signal according to the first protocol. The second communication section 53 generates an access waveform signal according to the second protocol. The generated access waveform signal is inputted to the semiconductor memory device 2. The first protocol and the second protocol are different from each other, mainly in terms of (1) a structure of a command issued by the information processing apparatus 1 and (2) a latency period.

More specifically, in the structure of the command, command lengths are different from each other. The first protocol adopts 8 bytes (64 bits), while the second protocol adopts 16 bytes (128 bits). Here, the command length is not limited thereto, and may be changed appropriately.

The latency period means a time period from when the information processing apparatus 1 (and more specifically, the communication section 5) inputs a data read-out command to the semiconductor memory device 2 to when the semiconductor memory device 2 starts to output read-out data to the information processing apparatus 1. In the first protocol, the latency period is a certain time period T (fixed value), while in the second protocol, the latency period has a variable value determined based on a transmission preparation completion signal that is inputted from a second encryption processing section 633 to a second interface section 613. The transmission preparation completion signal will be described later.

In this embodiment, the first communication section 51 is connected to the first encryption processing section 41, and the second communication section 53 is connected to the second encryption processing section 43. Thus, in a case where the first protocol is being used, a command encrypted based on the first algorithm is issued (transmitted) to the semiconductor memory device 2. In a case where the second protocol is used, a command encrypted based on the second algorithm is issued to the semiconductor memory device 2.

<Semiconductor Memory Device 2>

The semiconductor memory device 2 includes a memory controller 6 (memory control device) that controls reading out of data and the like, and a memory core 7 that stores therein various content data to be processed in the information processing apparatus 1.

<Memory Controller 6>

The memory controller 6 includes an interface section 61, a first encryption processing section 631, a second encryption processing section 633, a command analysis section 65, an encryption processing selection section 67, and a communication protocol selection section 69. The memory controller 6 accesses the memory core 7 based on a command input from the information processing apparatus 1, and transmits read-out data to the information processing apparatus 1.

<Interface Section 61>

The interface section 61 performs data communication with the information processing apparatus 1 according to the first protocol or the second protocol. The interface section 61 includes a first interface section 611 operable according to the first protocol and a second interface section 613 operable according to the second protocol. In this embodiment, the interface section 61 corresponds to a data transmission section of the present invention.

<First Encryption Processing Section 631>

The first encryption processing section 631 decrypts a command encrypted by the first encryption processing section 41, and inputs a resulting command to the command analysis section 65. The first encryption processing section 631 encrypts data read out from the memory core 7 based on the first algorithm, and inputs resulting data to the interface section 61.

<Second Encryption Processing Section 633>

The second encryption processing section 633 decrypts a command encrypted by the second encryption processing section 43, and inputs a resulting command to the command analysis section 65. The second encryption processing section 633 encrypts data read out from the memory core 7 based on the second algorithm, and inputs resulting data to the interface section 61.

The second encryption processing section 633 inputs the transmission preparation completion signal to the second interface section 613. The transmission preparation completion signal is a signal indicating that the second encryption processing section 633 has encrypted data read out from the memory core 7 and a preparation for transmission to the second interface section 613 is completed. If this signal is inputted, the second interface section 613 transmits data to the information processing apparatus 1. Accordingly, a timing of a data output from the second interface section 613 depends on a processing status of the second encryption processing section 633.

<Command Analysis Section 65>

The command analysis section 65 analyzes a decrypted command, thereby extracting a command ID and address information included in the command. The command analysis section 65 inputs a predetermined control signal corresponding to a result of the extraction to the encryption processing selection section 67, the communication protocol selection section 69, and the memory core 7.

More specifically, the command analysis section 65 inputs, to the encryption processing selection section 67, a control signal prompting a selection of either one of the first encryption processing section 631 and the second encryption processing section 633, and inputs, to the communication protocol selection section 69, a control signal prompting a selection of either one of the first interface section 611 and the second interface section 613. The command analysis section 65 also inputs a read-out signal and an address signal to the memory core 7.

<Encryption Processing Selection Section 67>

Based on the control signal inputted from the command analysis section 65, the encryption processing selection section 67 gives, to selectors 671 and 673, a selection signal for switching an element to execute the encryption processing between the first encryption processing section 631 and the second encryption processing section 633.

The selector 671 is a selector for switching an element that encrypts data to be transmitted from the semiconductor memory device 2 to the information processing apparatus 1, between the first encryption processing section 631 and the second encryption processing section 633. The selector 673 is a selector for switching an element that decrypts an encrypted command, between the first encryption processing section 631 and the second encryption processing section 633.

<Communication Protocol Selection Section 69>

Based on the control signal inputted from the command analysis section 65, the communication protocol selection section 69 inputs, to the interface section 61, a selection signal for switching an element that performs data communication with the information processing apparatus 1, between the first interface section 611 and the second interface section 613.

In this embodiment, if the communication protocol selection section 69 selects the first interface section 611, the encryption processing selection section 67 inputs a selection signal for selecting the first encryption processing section 631 to the selectors 671 and 673. That is, in a case of performing data communication with the information processing apparatus 1 according to the first protocol, the semiconductor memory device 2 transmits data encrypted based on the first algorithm to the information processing apparatus 1.

If the communication protocol selection section 69 selects the second interface section 613, the encryption processing selection section 67 inputs a selection signal for selecting the second encryption processing section 633 to the selectors 671 and 673. That is, in a case of performing data communication with the information processing apparatus 1 according to the second protocol, the semiconductor memory device 2 transmits data encrypted based on the second algorithm to the information processing apparatus 1.

<Memory Core 7>

The memory core 7 outputs data stored in a memory cell corresponding to the address information extracted by the command analysis section 65, to the first encryption processing section 631 or the second encryption processing section 633 via a data bus. The memory core 7 inputs a Ready signal indicating a ready state (a state where a preparation for a data output is completed) to the second encryption processing section 633. The second encryption processing section 633 starts to encrypt read-out data based on the Ready signal. Described above is the configuration and the function of the memory system 100.

<1.2. Operation of Memory System>

Next, an operation of the memory system 100 configured as above will be described. Firstly, a general operation procedure of a memory system will be described, and subsequently each procedure will be described in detail.

Figure 2:
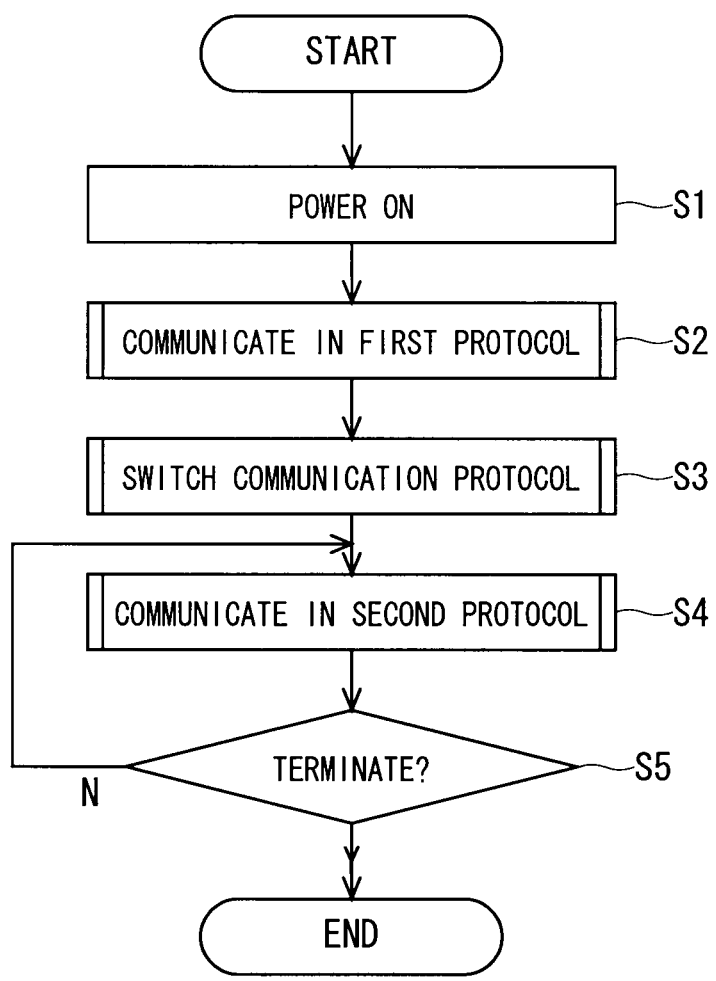
FIG. 2 is a flowchart showing a general operation procedure of the memory system.

FIG. 2 is a flowchart showing a general operation procedure of the memory system 100. Firstly, when the information processing apparatus 1 is powered on (step S1), the information processing apparatus 1 starts data communication with the semiconductor memory device 2 according to the first protocol (step S2). At this time, the information processing apparatus 1 executes the start-up read-out data 71. As mentioned above, the start-up read-out data 71 includes the designation information 72.

After acquiring the designation information 72, the information processing apparatus 1 executes a switching operation for switching the communication protocol from the first protocol to the second protocol (step S3). After the switching operation is completed, the information processing apparatus 1 starts data communication with the semiconductor memory device 2 according to the second protocol (step S4).

Additionally, the information processing apparatus 1 determines whether or not there is a termination instruction from an operator (step S5), and if there is a termination instruction, the information processing apparatus 1 terminates the data communication with the semiconductor memory device 2. If there is no termination instruction, the information processing apparatus 1 returns to step S4, and continues the data communication according to the second protocol. Described above is the general operation procedure. Next, procedures of the respective operations will be described in detail.

<1.2.1. Communication in First Protocol>

FIG. 3 is a flowchart showing details of a communication procedure in the first protocol. After starting communication in the first protocol, the information processing apparatus 1 issues a read-out command according to the first protocol (step S20).

More specifically, the command generation section 31 generates a read-out command having a length of 8 bytes and including a command ID for requesting reading out and address information. The address information corresponds to a physical address indicating a destination of the start-up read-out data 71. The generated read-out command is encrypted by the first encryption processing section 41, and inputted to the semiconductor memory device 2 via the first communication section 51.

The inputted read-out command is transferred to the first encryption processing section 631 via the first interface section 611, and decrypted (step S21). The decrypted read-out command is transmitted to the command analysis section 65, and the command is analyzed (step S22).

Since, unlike the switch command, the read-out command does not include information designating communication protocol, the memory system 100 continues the data communication according to the first protocol. Therefore, the command analysis section 65 inputs a control signal for performing data communication in the first protocol to the encryption processing selection section 67 and the communication protocol selection section 69. As a result, the first encryption processing section 631 and the first interface section 611 are selected (step S23).

The command analysis section 65 inputs, to the memory core 7, the address information extracted from the read-out command, and reads out the start-up read-out data 71 from the memory core 7 (step S24). The start-up read-out data 71 thus read out is transmitted to the first encryption processing section 631, and encrypted (step S25), and then transferred to the interface section 61.

Then, the first communication section 51 determines whether or not the certain time period T has elapsed since the read-out command was inputted to the semiconductor memory device 2 (step S26). The first communication section 51 waits until the certain time period T elapses, and then causes the first interface section 611 to transmit the encrypted start-up read-out data 71 to the information processing apparatus 1 (step S27).

To smoothly perform the data communication between the information processing apparatus 1 and the semiconductor memory device 2, it is desirable that in step S26 the certain time period T is set longer than a time period from when the read-out command is inputted to the first interface section 611 to when the preparation for outputting the read-out data to the information processing apparatus 1 is completed. That is, it is desirable that decryption of the command, reading out of data from the memory core 7, and encryption of at least a portion of the read-out data that is to be initially transmitted to the information processing apparatus 1 are completed in the semiconductor memory device 2.

The start-up read-out data 71 transmitted in step S27 is decrypted by the first encryption processing section 41 (step S28). Then, the data analysis section 33 extracts the designation information 72 from the decrypted start-up read-out data 71 (step S29).

Described above are the details of the communication procedure in the first protocol. Next, a procedure for switching the communication protocol (step S3) will be described in detail.

<1.2.2. Switching of Communication Protocol>

Figure 4:
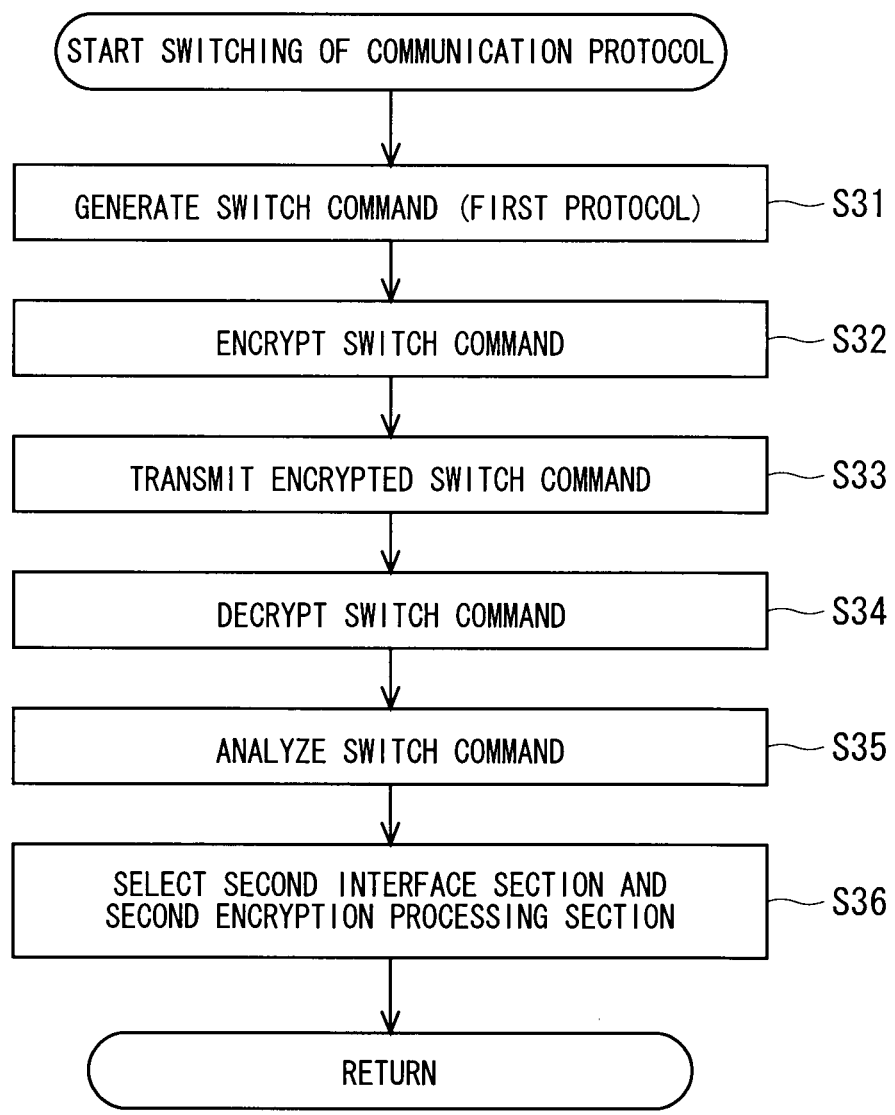
FIG. 4 is a flowchart showing details of a procedure for switching a communication protocol.

FIG. 4 is a flowchart showing details of a procedure for switching the communication protocol. The designation information 72 extracted in step S29 is transmitted to the switching control section 35, and the command generation section 31 generates the switch command (step S31). Here, the switch command has a command structure with a length of 8 bytes, and includes a command ID for requesting switching to the second protocol.

The generated switch command is transmitted to the first encryption processing section 41, and encrypted (step S32). The encrypted switch command is transmitted to the first communication section 51, and further transmitted to the semiconductor memory device 2 (step S33). The transmitted switch command is decrypted by the first encryption processing section 631 (step S34), and the command is analyzed by the command analysis section 65 (step S35).

Here, the switch command indicates switching the communication protocol to the second protocol. Accordingly, the command analysis section 65 inputs a control signal for performing data communication in the second protocol to the encryption processing selection section 67 and the communication protocol selection section 69. As a result, the second encryption processing section 633 and the second interface section 613 are selected (step S36). The above-described operation enables data communication according to the second protocol to be performed between the information processing apparatus 1 and the semiconductor memory device 2.

<1.2.3. Communication in Second Protocol>

FIG. 5 is a flowchart showing details of a communication procedure in the second protocol. After starting communication in the second protocol, firstly, whether or not an access request for accessing to the semiconductor memory device 2 is occurring in the information processing apparatus 1 is determined (step S41).

If there is an access request, the information processing apparatus 1 issues a read-out command according to the second protocol to the semiconductor memory device 2 (step S42). More specifically, the command generation section 31 generates a read-out command having a length of 16 bytes and including a command ID for requesting reading out and address information indicating a destination of object data, and transmits the read-out command to the second encryption processing section 43. The transmitted read-out command is encrypted by the second encryption processing section 43, and transmitted to the second communication section 53, and further transmitted to the semiconductor memory device 2. If there is no access request in step S41, the information processing apparatus 1 enters an idle state until an access request occurs.

The encrypted read-out command is transferred to the second encryption processing section 633 via the second interface section 613, and decrypted (step S43). The decrypted read-out command is transmitted to the command analysis section 65, and the command is analyzed (step S44).

Since the read-out command does not include information designating communication protocol, the memory system 100 continues the data communication according to the second protocol. Therefore, the command analysis section 65 inputs a control signal for performing data communication in the second protocol to the encryption processing selection section 67 and the communication protocol selection section 69. As a result, the second encryption processing section 633 and the second interface section 613 are selected again (step S45).

The command analysis section 65 executes reading out of the object data from the memory core 7 based on the address information extracted from the read-out command (step S46). After a preparation for outputting data requested to be read out is completed in the memory core 7, the memory core 7 transmits the read-out data to the second encryption processing section 633 and also inputs a Ready signal to the second encryption processing section 633. Thus, the second encryption processing section 633 starts to encrypt the read-out data (step S47).

The second interface section 613 determines whether or not the second encryption processing section 633 completes a preparation for transmitting the encrypted data based on the transmission preparation completion signal inputted from the second encryption processing section 633 (step S48). If a preparation for transmission is completed, the second interface section 613 starts to transmit, to the information processing apparatus 1, data transmitted from the second encryption processing section 633 (step S49). If a preparation for transmission is not completed, the second interface section 613 waits until the preparation for transmission is completed. The data transmitted to the information processing apparatus 1 is decrypted by the second encryption processing section 43, and subjected to an appropriate process such as data processing in the information processing apparatus 1.

In the data communication in step S4, the communication protocol may be shifted from the second protocol to the first protocol again. In such a case, data including designation information that designates the first protocol may be preliminarily stored in the memory core 7, and the communication protocol can be switched to the first protocol by the information processing apparatus 1 reading out the data.

A key (first key) used in the first encryption processing section 41 and the first encryption processing section 631, and a key (second key) used in the second encryption processing section 43 and the second encryption processing section 633 may not necessarily be always the same, but may be updated as appropriate. In such a case, new key information generated by the CPU 3 may be shared between the information processing apparatus 1 and the semiconductor memory device 2.

<1.3. Effect>

As described above, in the memory system 100 according to this embodiment, the data communication is performed using a plurality of communication protocols having different signal transmission/reception methods. This makes it difficult to analyze an operation specification of the memory system 100, and therefore the security function of the memory system 100 can be improved.

In a case where an RSA algorithm of the public-key cryptography or an encryption algorithm for performing encryption by changing a key length in each processing is implemented as the encryption algorithm in the memory system 100, a time period required before the second encryption processing section 633 completes a preparation for outputting to the second interface section 613 is changed in each processing.

Here, in the second protocol of this embodiment, data transmission to the information processing apparatus 1 is not started until the second encryption processing section 633 completes the preparation for outputting the encrypted data. Thus, implementing the above-described encryption algorithm in the second encryption processing section 633 enables the data security to be ensured and a data transmission timing to be changed for each data. This can make it more difficult to analyze the operation specification of the memory system 100.

2. Second Embodiment

In the memory system 100 according to the first embodiment, the switching of the communication protocol is implemented by the information processing apparatus 1 recognizing the designation information 72 stored in the memory core 7. However, a method for switching the communication protocol is not limited thereto.

<2.1. Configuration and Function>

FIG. 6 is a block diagram showing a memory system 100a according to a second embodiment. In a description of this embodiment, elements having the same functions as those of the first embodiment are denoted by the identical reference numerals, respectively, and descriptions thereof are omitted.

An information processing apparatus 1a of this embodiment includes a random number generation section 8 that generates a true or pseudo binary random number. Based on the binary random number generated by the random number generation section 8, a switching control section 35a that is implemented by an operation of a CPU 3a determines a communication protocol (a first protocol or a second protocol) to be used for data communication. The switching control section 35a causes a command generation section 31a to generate a switch command for switching to the determined communication protocol.

<2.2. Operation>

Figure 7:
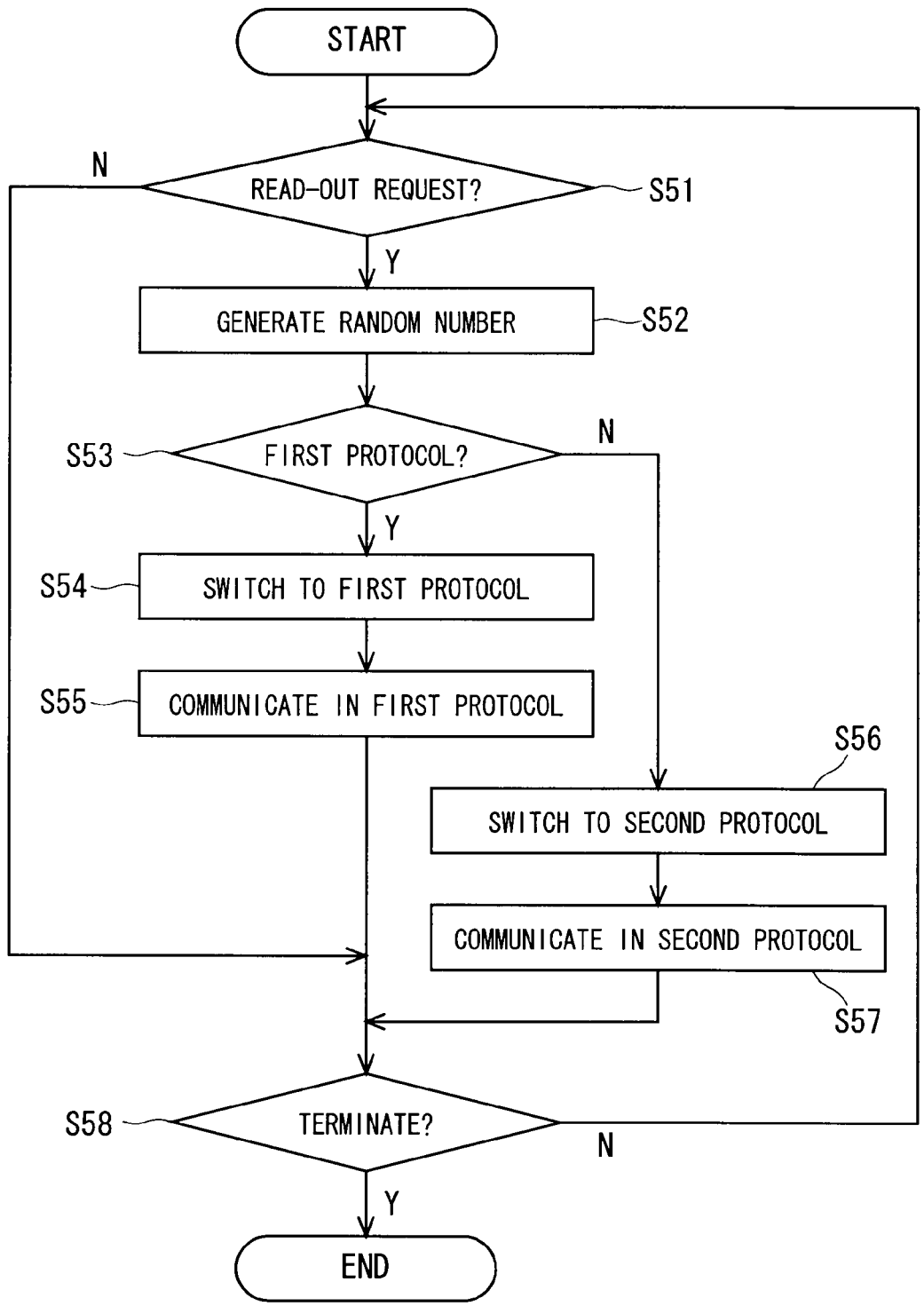
FIG. 7 is a flowchart showing an operation of the memory system.

FIG. 7 is a flowchart showing an operation of the memory system 100a. After being powered on, the information processing apparatus 1a performs a predetermined initial setting, and enters a monitoring state. In the monitoring state, the CPU 3a monitors whether or not an access request for accessing the semiconductor memory device 2 occurs (step S51) and whether or not there is a termination instruction (step S58).

If there is an access request for accessing the semiconductor memory device 2, the CPU 3a determines "Yes" in step S51, and causes the random number generation section 8 to generate a binary random number (step S52). The switching control section 35a determines whether or not a communication protocol to be used is the first protocol, based on the generated binary random number (step S53).

If the first protocol is selected (YES in step S53), the information processing apparatus 1a executes an operation for switching the communication protocol to the first protocol (step S54). This switching operation is executed in the same procedure as that of step S3 (see FIGS. 2 and 4) of the first embodiment.

More specifically, the information processing apparatus 1a issues a switch command designating the first protocol to the semiconductor memory device 2, according to the communication protocol being used at the time point of step S53. Based on this switch command, the semiconductor memory device 2 sets the first protocol as the communication protocol to be used. Then, the information processing apparatus 1a performs data communication with the semiconductor memory device 2 according to the first protocol (step S55).

If the second protocol is selected (NO in step S53), the information processing apparatus 1 executes an operation for switching the communication protocol to the second protocol (step S56). More specifically, similarly to step S54, the information processing apparatus 1 issues a switch command designating the second protocol to the semiconductor memory device 2, according to the communication protocol being used at the time point of step S53. Based on this switch command, the semiconductor memory device 2 sets the second protocol as the communication protocol to be used. Then, the information processing apparatus 1a performs data communication with the semiconductor memory device 2 according to the second protocol (step S57).

Although in this embodiment, a communication protocol to be used is determined each time an access request occurs, the timing of determination of the communication protocol is not limited thereto. For example, it may be acceptable that the communication protocol is re-determined when a predetermined time period elapses or when the number of times the communication is performed exceeds a predetermined number.

<2.3. Effect>

In this embodiment, the communication protocol to be used is randomly switched, which makes it difficult to analyze the operation specification of the memory system 100. Therefore, unauthorized copying of data, and the like, can be effectively suppressed.

3. Third Embodiment

Although in the above-described embodiment, an encryption processing section to be used for a particular communication protocol is fixed, a combination of the communication protocol and the encryption processing section is not limited to the fixed one.

FIG. 8 is a block diagram showing a memory system 100b according to a third embodiment. A CPU 3b included in an information processing apparatus 1b inputs a selection signal for selecting an element that performs encryption processing and communication to an encryption processing section 4a and a communication section 5a.

Based on a binary random number generated by the random number generation section 8, a switching control section 35b determines a communication protocol to be used in a memory system 100b, and also determines an encryption algorithm for encrypting a command and data to be communicated between the information processing apparatus 1 and the semiconductor memory device 2.

The command generation section 31b generates a switch command for switching an operation mode so as to perform data communication using the communication protocol and the encryption algorithm determined by the switching control section 35b. In the semiconductor memory device 2, the command analysis section 65 analyzes this switch command, and thereby inputs a control signal for switching the encryption algorithm and the communication protocol to the encryption processing selection section 67 and the communication protocol selection section 69.

In the memory system 100b according to this embodiment, two kinds of communication protocols and two kinds of encryption processing sections are freely combined, and thus the data communication can be performed in four patterns (=2×2) in total. In this manner, the combination of the encryption algorithm and the communication protocol is freely changed in the information processing apparatus 1 and the semiconductor memory device 2, which can effectively suppress an unauthorized access to the memory core 7.

4. Modification

While some embodiments of the present invention have been described, the above-described embodiments are not restrictive. Various modifications may be made to the present invention.

For example, although in the above-described embodiments, the command is encrypted by the first encryption processing section or the second encryption processing section and transferred to the semiconductor memory device, the command may be transferred without an encryption applied thereto.

Although in the above-described embodiments, the information processing apparatus and the semiconductor memory device use two kinds of communication protocols and two kinds of encryption algorithms to thereby perform data communication, the memory system may be configured such that data communication can be performed using a greater number of communication protocols and encryption algorithms.

Although in the above-described embodiments, the switching of the communication protocol is performed based on the designation information 72 and the binary random number generated by the random number generation section 8, a method of switching is not limited thereto. For example, it may be acceptable that which of the communication protocols is to be used by the switching control section or the like depends on data to be read out, and the communication protocol is switched appropriately.

For example, in data communication, for important data (such as data that should not be acquired without authorization), a communication protocol having a high strength of encryption is used though it takes much time to execute the encryption processing, while for other kinds of data, a communication protocol requiring a relatively short time for performing the encryption processing is used. This makes it difficult to decipher the important data while allowing efficient data communication.

It may also be acceptable that an accessible memory area in the memory core 7 is limited for each communication protocol. For example, in a case where communication protocols have different strengths of encryption, important data is stored in a memory area accessible only in a communication protocol having a high strength of encryption. Thereby, the confidentiality of data can be improved.

A part or the whole of the blocks shown in the drawing may be implemented as hardware using a special logic circuit, or may be implemented as software using a CPU.

Furthermore, the configurations described in the above-described embodiments and modifications can be appropriately combined as long as they are not contradictory to each other.

The invention claimed is:

1. A memory control device to control access to a memory core storing data therein, said memory control device comprising:
processing circuitry including:
communication protocol selection circuitry to select a communication protocol from a plurality of communication protocols having different signal transmission/reception methods, based on a first command input given from an external apparatus; and
data transmission circuitry to transmit, to the external apparatus, data read out from the memory core based on a read-out request given from the external apparatus, according to said communication protocol selected by said communication protocol selection circuitry,
wherein said data transmission circuitry transmits, to the external apparatus, data in which designation information designating the selected communication protocol is added to read-out data read out from the memory core in response to the read-out request given from the external apparatus, and
wherein said communication protocol selection circuitry selects said selected communication protocol based on said first command input issued by the external apparatus based on said designation information.

2. The memory control device according to claim 1, wherein said processing circuitry further includes:
a plurality of encryption processing circuitry portions having different encryption methods; and
encryption processing selection circuitry to select an encryption processing circuitry portion from said plurality of encryption processing circuitry portions, based on a second command input given from the external apparatus,
wherein said data transmission circuitry transmits, to the external apparatus, data encrypted by the encryption processing circuitry portion selected by said encryption processing selection circuitry.

3. The memory control device according to claim 2, wherein said plurality of communication protocols include a communication protocol by which the transmission to the external apparatus starts after the data encrypted by said selected encryption processing circuitry portion is allowed to be outputted to said data transmission circuitry.

4. A semiconductor memory device comprising:
a memory core storing therein data to be processed by an external apparatus; and
processing circuitry including:
communication protocol selection circuitry to select a communication protocol from a plurality of communication protocols having different signal transmission/reception methods, based on a command input given from the external apparatus; and
data transmission circuitry to transmit, to the external apparatus, data read out from said memory core based on a read-out request given from the external apparatus, according to said communication protocol selected by said communication protocol selection circuitry,
wherein said data transmission circuitry transmits, to the external apparatus, data in which designation information designating said selected communication protocol is added to read-out data read out from said memory core in response to the read-out request given from the external apparatus, and
wherein said communication protocol selection circuitry selects said selected communication protocol based on said command input issued by the external apparatus based on said designation information.

5. A memory system comprising an information processing apparatus and a semiconductor memory device, wherein said semiconductor memory device includes:
a memory core storing therein data to be processed by an external apparatus; and
first processing circuitry including:
communication protocol selection circuitry to select a communication protocol from a plurality of communication protocols having different signal transmission/reception methods, based on a command input given from the external apparatus; and
data transmission circuitry to transmit, to the external apparatus, data read out from said memory core based on a read-out request given from the external apparatus, according to said communication protocol selected by said communication protocol selection circuitry,
wherein said data transmission circuitry transmits, to the external apparatus, data in which designation information designating said selected communication protocol is added to read-out data read out from said memory core in response to the read-out request given from the external apparatus, and
wherein said communication protocol selection circuitry selects said selected communication protocol based on said command input issued by the external apparatus based on said designation information.

6. The memory system according to claim 5, wherein said information processing apparatus includes:

second processing circuitry including:
- command generation circuitry to generate a command that designates, to said semiconductor memory device, the communication protocol from said plurality of communication protocols; and
- communication circuitry to perform data communication with said semiconductor memory device according to any of said plurality of communication protocols, wherein said communication protocol selection circuitry of said first processing circuitry of said semiconductor memory device selects the communication protocol based on the command generated by said command generation circuitry.

7. A memory control method to control access to a memory core storing data therein, said method comprising:
- selecting a communication protocol from a plurality of communication protocols having different signal transmission/reception methods, based on a command input given from an external apparatus;
- transmitting, to the external apparatus, data read out from the memory core based on a read-out request given from the external apparatus, according to said communication protocol selected in said selecting; and
- transmitting, to the external apparatus, data in which designation information designating the selected communication protocol is added to read-out data read out from the memory core in response to the read-out request given from the external apparatus, wherein said selecting the selected communication protocol is based on said command input issued by the external apparatus based on said designation information.

8. The memory control device according to claim 1, wherein said first command input from the external apparatus includes designation information designating a previously selected communication protocol.

9. The semiconductor memory device according to claim 4, wherein said command input from the external apparatus includes designation information designating a previously selected communication protocol.

10. The memory system according to claim 5, wherein said command input from the external apparatus includes designation information designating a previously selected communication protocol.

11. The memory control method according to claim 7, wherein said command input from the external apparatus includes designation information designating a previously selected communication protocol.

* * * * *